(12) United States Patent
Binding et al.

(10) Patent No.: US 9,946,285 B2
(45) Date of Patent: Apr. 17, 2018

(54) ENERGY ALLOCATION SYSTEM FOR BALANCING ENERGY CONSUMPTION

(71) Applicant: International Business Machines Corporation, Armonk, NY (US)

(72) Inventors: Carl Binding, Rueschlikon (CH); Olle L. Sundstroem, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 14/366,530

(22) PCT Filed: Dec. 19, 2012

(86) PCT No.: PCT/IB2012/057472
§ 371 (c)(1),
(2) Date: Jun. 18, 2014

(87) PCT Pub. No.: WO2013/093794
PCT Pub. Date: Jun. 27, 2013

(65) Prior Publication Data
US 2015/0127179 A1    May 7, 2015

(30) Foreign Application Priority Data
Dec. 23, 2011  (EP) .................................... 11195646

(51) Int. Cl.
*G05D 3/12* (2006.01)
*G05F 1/66* (2006.01)
(Continued)

(52) U.S. Cl.
CPC ............. *G05F 1/66* (2013.01); *G05B 13/026* (2013.01); *G06Q 50/06* (2013.01); *H02J 3/28* (2013.01);
(Continued)

(58) Field of Classification Search
None
See application file for complete search history.

(56) References Cited

U.S. PATENT DOCUMENTS 7,385,373 B2   6/2008  Doruk et al.
8,200,373 B2   6/2012  Stiles et al.
(Continued)

FOREIGN PATENT DOCUMENTS

JP    2005122517 A    5/2005
WO    2008141246 A2   11/2008
(Continued)

OTHER PUBLICATIONS

Abbey, C. "Energy Storage System Optimization and Control with Wind Energy". Thesis submitted to McGill University in partial fulfillment of the requirements for the degree of Doctorate of Philosophy in Electrical Engineering. Copyright 2009 Chad Abbey. Oct. 2, 2009.

(Continued)

*Primary Examiner* — Wissam Rashid
(74) *Attorney, Agent, or Firm* — John W. Hayes; William H. Hartwell

(57) ABSTRACT

The present invention relates to an energy allocation system for operating at least an energy storage device to substantially balance the energy consumed by the energy storage device with the energy supplied thereto, comprising the steps of: determining a power flexibility of the energy storage device by generating an upper time-varying power function; predicting energy consumption data per discrete time-slots over a given time-window for the device; predicting a demand for energy by the device in a given planning time-period; generating a time-varying upper energy function for the demand prediction that defines an uppermost limit for the supply of energy to the device; generating a time-varying lower energy function for the (Continued)

demand prediction that defines a lowermost limit for the supply of energy to the device, and supplying energy to the device in a range defined by the limits specified by the upper energy function and the lower energy function.

19 Claims, 7 Drawing Sheets

(51) Int. Cl.
    *H02J 3/28*     (2006.01)
    *G06Q 50/06*     (2012.01)
    *G05B 13/02*     (2006.01)
    *H02J 3/00*     (2006.01)

(52) U.S. Cl.
    CPC ... *H02J 2003/003* (2013.01); *H02J 2003/007* (2013.01); *Y02E 40/76* (2013.01); *Y02E 60/76* (2013.01); *Y04S 10/54* (2013.01); *Y04S 10/545* (2013.01); *Y04S 40/22* (2013.01)

(56) References Cited

U.S. PATENT DOCUMENTS

| | | | |
|---|---|---|---|
| 8,457,802 | B1 | 6/2013 | Steven et al. |
| 2003/0061091 | A1 | 3/2003 | Amaratunga et al. |
| 2007/0276547 | A1 | 11/2007 | Miller |
| 2008/0039980 | A1 | 2/2008 | Pollack et al. |
| 2010/0138363 | A1 | 6/2010 | Batterberry et al. |
| 2010/0274402 | A1 | 10/2010 | Shaffer |
| 2010/0286937 | A1 | 11/2010 | Hedley et al. |
| 2011/0004358 | A1 | 1/2011 | Pollack et al. |
| 2011/0047052 | A1 | 2/2011 | Cornish |
| 2011/0082598 | A1 | 4/2011 | Boretto et al. |
| 2011/0208365 | A1 | 8/2011 | Miller |
| 2011/0231028 | A1 | 9/2011 | Ozog |
| 2011/0276194 | A1 | 11/2011 | Emalfarb et al. |
| 2012/0054139 | A1 | 3/2012 | Nikovski et al. |
| 2012/0068540 | A1 | 3/2012 | Luo et al. |
| 2014/0094983 | A1 | 4/2014 | Dykeman et al. |
| 2014/0094984 | A1 | 4/2014 | Dykeman et al. |

FOREIGN PATENT DOCUMENTS

| | | | |
|---|---|---|---|
| WO | 2012045027 | A1 | 4/2012 |
| WO | 2013093794 | A2 | 6/2013 |

OTHER PUBLICATIONS

Bendtsen J., et al. "Hierarchical Model Predictive Control for Resource Distribution". 49th IEEE Conference on Decision and Control. Dec. 15-17, 2010. Copyright 2010 IEEE. pp. 2468-2473.
Binding, C., et al. "Electrical Vehicle Fleet Integration in the Danish Edison Project—A Virtual Power Plant on the Island of Bornholm". RZ 3761 (#99771) Jan. 20, 2010.
Binding, C., et al. "Energy Allocation System", filed on Dec. 23, 2011 and assigned a serial No. EP 11195646.2.
Edmonds, J. "Matroids and the Greedy Algorithm". Mathematical Programming 1 (1971). pp. 127-136. North-Holland Publishing Company.
Frank, A. and Tardos, E. "Generalized Polymatroids and Submodular Flows". Mathematical Programming 42 (1988). pp. 489-563.
Fujishige, S. "Lexicographically Optimal Base of a Polymatroid with Respect to a Weight Vector". Mathematics of Operations Research, vol. 5, No. 2 (May 1980). Accessed on: Dec. 1, 2012. pp. 186-196. Institute for Operations Research and the Management Sciences.
Fujishige, S., et al. "The Minimum-Norm-Point Algorithm Applied to Submodular Function Minimization and Linear Programming". Sep. 2006.
Groenevelt, H. "Two algorithms for maximizing a separable concave function over a polymatroid feasible region". European Journal of Operational Research 54 (1991). North-Holland. pp. 227-236.
Hammerstrom, D.J., et al. "Pacific Northwest GridWise™ Testbed Demonstration Projects". Part I. Olympic Peninsula Project. PNNL-17167. Oct. 2007.
Hammerstrom, D.J., et al. "Pacific Northwest GridWise™ Testbed Demonstration Projects". Part II. Grid Friendly™ Appliance Project. PNNL-17079. Oct. 2007.
Hay, C. et al. "Introducing Electric Vehicles into the Current Electricity Markets". Edison Deliverable2.3. Version 3.0. Electric Vehicles in a Distributed and Integrated Market Using Sustainable Energy and Open Networks. May 25, 2010. Copyright Edison Consortium 2009.
Kok, J.K., et al. "PowerMatcher: Multiagent Control in the Electricity Infrastructure". AAMAS' 05. Jul. 25-29. Utrecht, Netherlands. Copyright ACM 2005.
Kraning, M., et al. "Message Passing for Dynamic Network Energy Management". Working Draft—Apr. 6, 2012. arXiv:1204.1106v1 [math.OC] Apr. 5, 2012.
O'Neill, D., et al. "Residential Demand Response Using Reinforcement Learning".
Orlin, J.B. "A Faster Strongly Polynomial Time Algorithm for Submodular Function Minimization". Sloan School of Management, MIT, Cambridge, MA.
Schroeder, A., et al. "Modeling Storage and Demand Management in Electricity Distribution Grids". Discussion Papers 1110. Berlin. Mar. 2011.
Sundstrom, O. and Binding, C. "Planning Electric-Drive Vehicle Charging Under Constrained Grid Conditions". 2010 International Conference on Power System Technology (POWERCON). Dec. 15, 2010.
Trangbaek, K., et al. "Exact Power Constraints in Smart Grid Control". 2011 50th IEEE Conference on Decision and Control and European Control Conference (CDC-ECC). Orlando, FL, USA. Dec. 12-15, 2011.
International Search Report Dated Jan. 29, 2013. GB1217363.9.
International Search Report Dated Sep. 13, 2013. PCT/IB2012/057472 with Written Opinion.

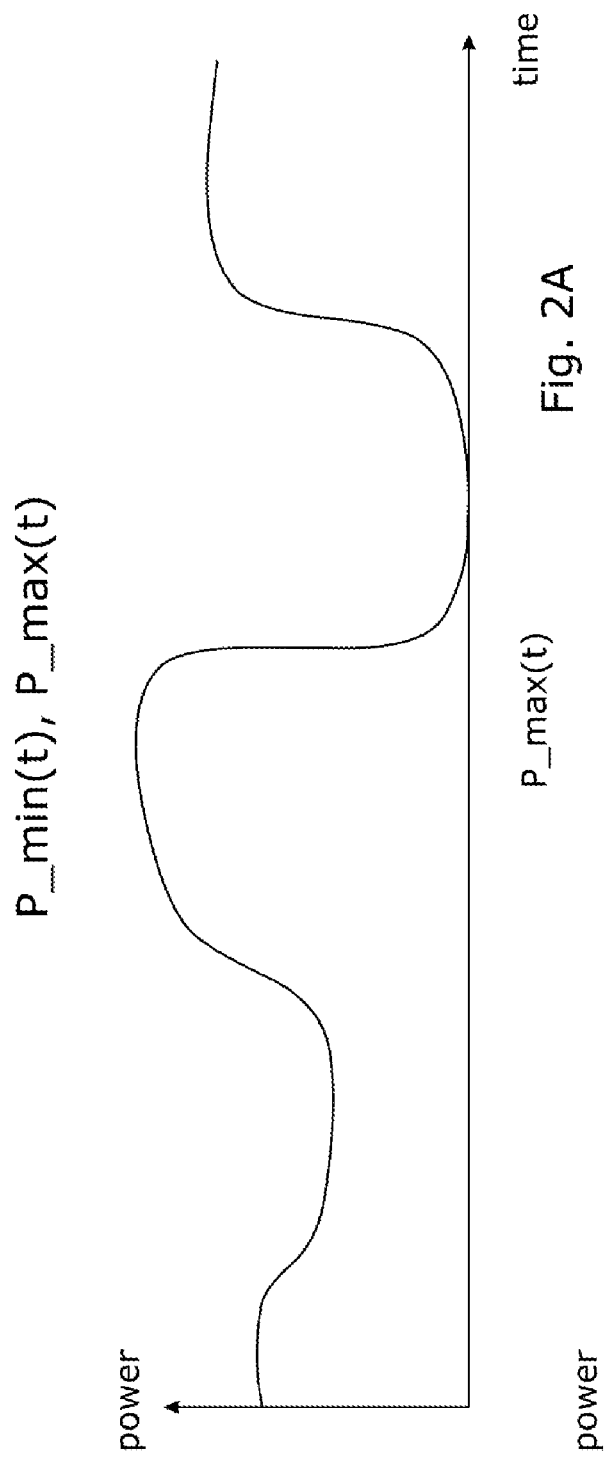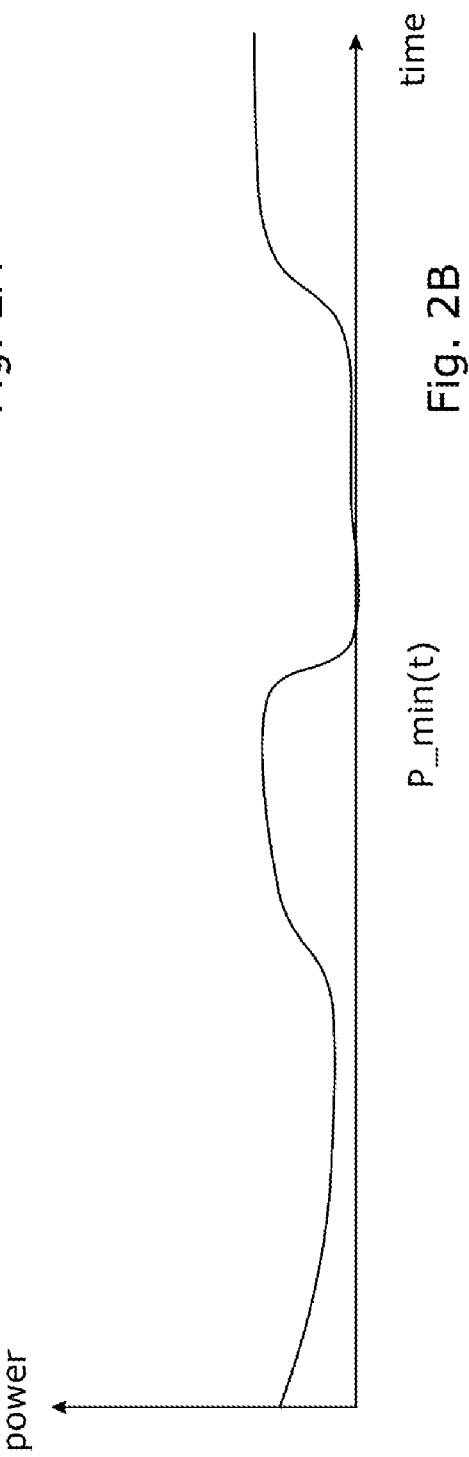

ENERGY ALLOCATION SYSTEM FOR BALANCING ENERGY CONSUMPTION

CROSS-REFERENCE TO RELATED APPLICATIONS

This is a U.S. National Phase application which claims priority to International Application PCT/IB2012/057472, filed Dec. 19, 2012, which in turn claims priority to Patent Application No. EP 11195646.2, filed on Dec. 23, 2011. The contents of both of these applications are incorporated herein by reference in their entireties.

FIELD OF THE INVENTION

The present invention relates to an energy allocation system for allocating energy to a given set of energy storage devices thereby to substantially balance energy consumption by each of the energy storage devices with the energy supplied thereto. The present invention also extends to a control loop for allocating energy to, and a method of operating, an energy storage device thereby to substantially balance energy consumption by the energy storage device with the energy supplied thereto.

BACKGROUND OF THE INVENTION

It is globally acknowledged that the depletion of natural energy resources, environmental issues arising from the use thereof and the lack of alternative energy resources are but some of the issues that impact the profile of the energy landscape of the future. To date, natural energy resources continue to be used for the generation of different energy forms. For example, the thermal energy generated from fossil fuels such as oil, gas and coal is converted to other energy forms such as electrical, motion and so on. However, such natural energy resources, and fossil fuels in particular, are becoming scarce, cannot be replaced and/or detrimentally impact the environment. Nuclear energy has been used as an alternative energy form to the aforementioned energy resources. In particular, nuclear fission has been used for the generation of heat and electricity. However, there are short-term risks such as incidences associated with nuclear fission as well as long term issues such as storage and/or disposal of radioactive waste resulting from nuclear fission.

In order to address the above-described issues and/or to provide alternative energy resources, investment, development and research into renewable energy resources such as, for example, solar and wind power, is being done. An advantage associated with renewable energy resources, and from the viewpoint of sustainability, is that they may be considered to be abundant given that, thus far, there is no known limit on the life expectancy of the sun. However, there are some issues associated with renewable energy resources, which restrict them from providing a suitable alternative to and/or completely replacing fossil fuels for the generation of energy. One such issue is that renewable energy resources are time-variant in their occurrence—the wind does not always blow and the solar irradiance depends on the time of the day and on cloud movement. A further issue is that renewable energy resources may be area-specific in that they may occur more abundantly in some areas compared to others, such as, for example, coastal regions and deserts, which may be far away from the demand of such resources, thereby necessitating the consideration of transport issues to the location(s) of the demand.

With respect to the consumption aspect of the energy chain, demand for energy may also be variable and random, albeit with differences from the variability and randomness with which energy is generated using renewable energy resources. To facilitate the alignment of energy demand/consumption with energy supply/generation, particularly where renewable energy resources are used for the energy supply/generation, energy storage devices may be used and/or considered. However, for certain energy forms, such as, for example, electrical energy, it may be a challenge to provide energy storage devices with sufficient capacity, if at all. In this regard, although pump storage plants may provide a solution, they are usually implemented in certain terrains such as mountainous regions and require access to water. Other methods such as, for example, hydrogene extraction and compressed air have associated technical limitations and so are not widely used. As for electrical accumulator technology, it is costly and may be considered to have inadequate storage density, thus space and other resources may have to be facilitated for its implementation in a realistic energy chain scenario.

Some proposals have been made to facilitate alignment between power generation and power consumption/demand. Reference is made to the document titled, "Pacific Northwest Gridwise testbed demonstration projects: Part i. Olympic peninsula project", published in the Technical Report PNNL-17167, Pacific Northwest National Laboratory, October 2007 by D. J. Hammerstrom et. al and also to the document titled, "Pacific Northwest Gridwise testbed demonstration projects: Part ii. Grid-friendly appliance project", published in the Technical Report PNNL-17079, Pacific Northwest National Laboratory, October 2007 by D. J. Hammerstrom et. al. These documents publish the investigation conducted in the Pacific Northwest Gridwise project where price incentives were coupled to the generated power and individual electrical appliances could react—momentarily—to power shortages, where a power shortage was observed by a reduced grid frequency, this scenario highlighting how the grid frequency may serve as a universal indicator of the power present in a power grid. The Pacific Northwest Gridwise project is concerned with the alignment of power consumption with power generation rather than aligning energy consumption with energy generation, that is, only current/power decisions are addressed rather than the attainment of energy goals by the provision of power over a given time-period.

Reference is now made to the Danish EDISON project as documented in, "Electrical Vehicle Fleet Integration in the Danish EDISON project—A virtual power plant on the island of Bornholm", published in Proc. IEEE Power & Energy Society General Meeting 2010, Minneapolis, Minn., USA, Jul. 25-29, 2010, also available at: URL:domino.research.ibm.com/library/cyberdig.nsf/papers/ 9C976F3545EA6E EE852576AF003208EE/$File/ rz3761.pdf, by C. Binding et. al, and "Introducing Electrical Vehicles into the current electricity markets", EDISON Deliverable D2.3, Version 3, C. Hay, M. Togeby, N.C. Bang (Ea Energy Analyses), C. Sondergren (Danish Energy Association), L. H. Hansen (Dong Energy), May 25, 2010, URL:www.edison-net.dk//media/EDISON/Reports/Edison Deliverable2.3Version3.0.ashx. Like the Pacific Northwest Gridwise project, the Danish EDISON project, is also based on price signals that are coupled to power generation and works only in the power dimension rather than in the energy dimension.

Another proposal to facilitate addressing the misbalance between power generation and power consumption can be found in the document titled, "Powermatcher: multiagent control in the electricity infrastructure", published in the Proceedings of the fourth international joint conference on Autonomous agents and multiagent systems, pages 75-82, ACM 2005 by J. K. Kok, C. J. Warmer and I. G. Kamphuis. In the PowerMatcher system, the demand aspects in the power chain hierarchically express their power demand and pass their bids to the generation entities, that is, power generation sources. If mismatching between bids and offers are detected, an auctioning approach to find a feasible bid/offer relation is taken. The PowerMatcher system is organised hierarchically and so it may be scaled, but it has increased real-time communication requirements in order to support an auction-style balancing between power supply/generation and power demand/consumption. Like the Pacific Northwest Gridwise project and the EDISON project, the Powermatcher system operates in the power dimension rather than the energy dimension, i.e. there is no guarantee that sufficient amounts of power are delivered to a demand unit over a given time-period and, thus, in the event that a price quoted in a bid/offer in respect of a given demand unit is considered to be relatively high, no power will be fed into that demand unit and so it will not accumulate energy. In this case, and for example, where the demand unit is embodied by an electrical appliance such as the battery of an electrical vehicle, it will remain uncharged and, if it is a hot-water boiler, then it will not be heated.

Reference is now made to the document titled, "Hierarchical model predictive control for resource distribution", published in Proceedings of the $49^{th}$ IEEE conference on decision and control, Atlanta Ga., USA, December 2010, IEEE, by Bendtsen et. al wherein a hierarchical concept using aggregation towards a high-level controller is proposed. Like the above-described documents, this disclosure is concerned with the alignment of power generation with power consumption rather than working in the energy dimension to fulfil an energy goal. Whilst energy constraints have been expressed in terms of the maximum and minimum total energy that can be stored in a device, these terms are static and do not reflect the time-varying need of stored energy as related to energy consumption and inflowing power/energy.

SUMMARY OF THE INVENTION

According to an embodiment of a first aspect of the present invention, there is provided a method for operating at least an energy storage device to substantially balance the energy consumed by the energy storage device with the energy supplied thereto, comprising the steps of: determining a power flexibility of the energy storage device by generating an upper time-varying power function and a lower time-varying power function that respectively represent the maximum power and the minimum power that can be supplied to the device at any given point in time when the energy storage device is in use; predicting energy consumption data per discrete time-slots over a given time-window for the device; predicting a demand for energy by the device in a given planning time-period by consecutively accumulating the predicted energy consumption data per discrete time-slots in the planning time-period that correspond with the discrete time-slots in the time-window over which the energy consumption data is predicted; generating a time-varying upper energy function for the demand prediction that defines an uppermost limit for the supply of energy to the device; generating a time-varying lower energy function for the demand prediction that defines a lowermost limit for the supply of energy to the device, and supplying energy to the device in a range defined by and between the limits specified by the upper energy function and the lower energy function. In contrast to previously-proposed techniques, both of the current power decisions and future energy goals of an energy storage device are addressed in an embodiment of the present invention. Furthermore, prediction of the demand of the energy storage device in a given time-period is done by accumulating the predicted energy consumption data and this can be done by addition, which is a linear operation, and, therefore, may be performed with reduced processing resources than if a non-linear operation were used.

Preferably, in the step of supplying energy to the device, the power provided to the device at any given point in time is selected to be within a range defined by, and between, the limits specified by the upper power function and the lower power function. By determining a power flexibility range as given by the upper power function and the lower power function and energy demand prediction as given by the upper energy function and the lower energy function, a supplier of power/energy resource has flexibility in terms of time and power supplied to a given energy storage device, which extends the advantage of versatility to an embodiment of the present invention.

Desirably, in the step of generating the upper energy function, energy is taken to be supplied to the energy storage device immediately after the occurrence of an energy consumption event and so as to replenish the energy storage device with the energy consumed in that energy consumption event. Preferably, in the step of generating the lower energy function, energy is taken to be supplied to the energy storage device just before the occurrence of an energy consumption event and such that a demand for energy corresponding to that energy consumption event is met. The upper energy function and the lower energy function define limits for a range of flexibility for the provision of energy to the energy storage device, which is particularly beneficial where the energy is provided by a fluctuating energy resource, such as, a renewable resource like wind power, for example. With respect to the generation of the upper energy function and the lower energy function, an initial amount energy $e_0$ in the energy storage device at a given point in time before the occurrence of a given set of energy consumption events, a maximum amount of energy e_max that may be provided to the energy storage device, and a minimum amount of energy e_min to be maintained in the energy storage device are desirably determined. With respect to the generation of the upper energy function, the energy levels in the energy storage device are taken to be ramped from the initial amount of energy e0 stored in the device to the maximum amount of energy e_max that may be provided to the energy storage device, before the occurrence of any energy consumption events.

According to an embodiment of a second aspect of the present invention, there is provided an energy allocation system for allocating energy to at least a given set of energy storage devices that are arranged in a hierarchical tree of nodes comprising at least a parent node with corresponding children nodes, thereby to substantially balance energy consumption by each of the energy storage devices with the energy supplied thereto, the system comprising: at least a prediction layer being configurable to predict at least a demand for energy in discrete time-slots in a given planning time-period in the future and to generate power flexibility data for each of the energy storage devices in the given set from information on an energy status and event status of each of the devices at a given point in time; an aggregation layer comprising an aggregation sub-layer that is configurable to hierarchically aggregate the energy demand prediction and power flexibility data for the given set of energy storage devices, and an aggregation top-layer that is configurable to aggregate the results of the aggregation sub-layer, thereby to obtain data on the total energy demand prediction and power flexibility for the given set of energy storage devices; an allocation layer, which is configurable to generate a reference power supply curve indicating the power available for supply in the discrete time-slots of the planning time-period to the given set of energy storage devices based on the aggregation results received from the aggregation top-layer and a prediction on the energy supply by a given energy resource that has been selected to supply energy to the given set of energy storage devices, wherein the aggregation layer is configurable to hierarchically disaggregate the reference power supply curve into individual power supply curves for provision to each of the energy storage devices in the given set of energy storage devices, thereby giving each of the energy storage devices a corresponding power schedule to be followed on when to consume energy and how much energy to consume in a given point in time when the energy storage device is in use in the given planning time-period. In this way, energy consumption of a relatively large number of energy storage devices may be tailored to follow the energy generation, which is of particular benefit when the energy resource selected for supplying energy is a fluctuating energy resource such as a renewable energy resource. Furthermore, scaling is an advantage due to the hierarchical arrangement in an embodiment of the present invention. A still further advantage is that boundaries on the power flexibility and the energy demand are provided at the aggregation level/layer, thus, the allocation layer being the top-level in the hierarchy has a knowledge of the aggregated boundaries associated with the energy storage devices at the bottom of the hierarchy.

According to an embodiment of a third aspect of the present invention, there is provided a control loop for the allocation of energy to at least an energy storage device thereby to substantially balance energy consumption by the energy storage device with the energy supplied thereto, comprising: at least an energy consumption monitoring unit for predicting data on the energy consumption by the energy storage device over a given time-window when the energy storage device is in use; at least a demand prediction unit for predicting a demand for energy by the energy storage device in a given planning time-period in the future on the basis of the predicted energy consumption data; at least an energy supply prediction unit for predicting energy supply in the given planning time-period by a given energy resource that has been selected to supply energy to the energy storage device; at least a schedule provider unit for producing a schedule for the provision of power to the energy storage device in the given planning time-period on the basis of the predicted energy demand of the energy storage device and the predicted energy supply by the selected energy resource.

BRIEF DESCRIPTION OF THE DRAWINGS

Reference will now be made, by way of example, to the accompanying drawings, in which:

FIGS. 2a and 2b schematically illustrate examples of power functions, P_max(t) and P_min(t) in an embodiment of the present invention;

DETAILED DESCRIPTION

It is desirable to be able to address the energy goals of demand units, that is, providing power to the demand unit over a given time-period thereby to facilitate a desired operation, and to do so while taking advantage of the inherent, albeit limited, flexibility of energy storage devices. Particularly, it is a challenge to facilitate that the energy consumption by a relatively large number of energy storage devices follows the supply/generation of energy by an energy provider. Within the description, the same reference numbers or signs are used to denote the same parts or the like.

Figure 1:
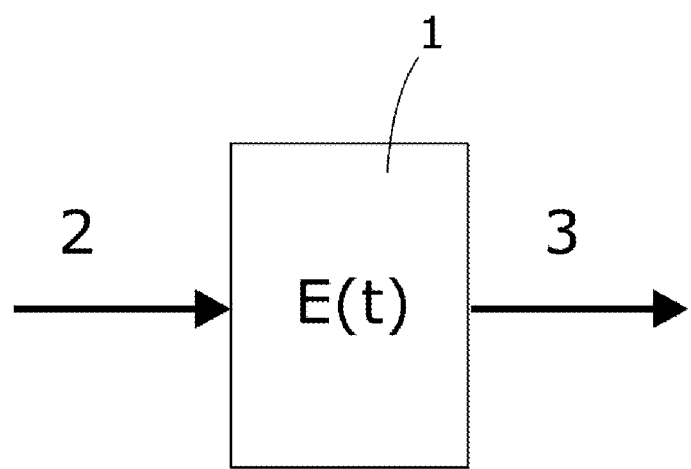
FIG. 1 schematically illustrates the principle of a device model in an embodiment of the present invention.

Reference is now made to FIG. 1, which schematically illustrates the principle of a device model in an embodiment of the present invention. The device is preferably an energy storage/buffering device 1 and may, for example, be the battery of an electric vehicle or a hot-water boiler. Generally, in an embodiment of the present invention, the energy storage device 1 may be a device capable of feeding power back into the power grid and, indeed, also a device where there is no direct link between when the power is being consumed by the device and when the energy is supplied thereto. The energy E(t) in the energy storage device 1 is measured from the difference of the energy inflow, which is the energy provided to the energy storage device 1 in a given time window, and the energy outflow, which is the energy consumed by the energy storage device 1 in a given time-period. The time-integral of the supplied, reference power P_ref(t), the latter being denoted by reference numeral 2 in FIG. 1, gives a measure of the energy inflow. The time-integral of the power consumed P_cons(t), the latter being denoted by reference numeral 3 in FIG. 1, gives a measure of the energy outflow. Regarding P_cons(t), accounted therein are leakages and the user level power, that is, the real demand for energy placed by an external user on the energy storage device 1. In summary, E(t) is given by:

$$E(t) = \int_0^t p_{ref}(\tau)d\tau - \int_0^t p_{cons}(\tau)d\tau + e_0$$

where e0 is the resident/initial amount of energy in the energy storage device 1; it is the energy level in the energy storage device 1 at t=0, that is, E(0)=e0 where t=0 is the start of a planning time-period.

In an embodiment of the present invention, a power flexibility of the energy storage device 1 is determined by prediction. In this regard, time-varying power functions P_max(t) and P_min(t) are obtained, examples of which are shown in FIGS. 2a and 2b, that respectively express the maximum power and the minimum power that may be supplied to the energy storage device 1 in a given planning time-period. Both of P_max(t) and P_min(t) are device specific. For the scenario P_min(t)=0, this denotes that the energy storage device 1 in an embodiment of the present invention is switched off. For another scenario P_min(t)<0, this denotes that the energy storage device 1 can generate electrical power from stored energy, this being the case for accumulators, super-capacitors, fly-wheels, hydrolysed storage and such like, and is capable of feeding electrical power back into the power grid. In an embodiment of the present invention, the assumption is made that the supplied reference power P_ref(t) to the energy storage device 1 by a provider may vary continuously or in discrete steps between P_max(t) and P_min(t).

Figure 3:
FIG. 3 schematically illustrates predicted data on the energy consumption over a given time period in an embodiment of the present invention.

Referring now to FIG. 3, which shows an example of predicted data on the energy consumed E_consumed(t) by an energy storage device 1 in an embodiment of the present invention in a given time-window. Energy consumption is mapped per discrete time-slots in the given time-window over which the prediction is done. In FIG. 3, the bars represent the occurrence of energy consumption in corresponding time-slots and e1, e2, e3, e4 and e5 are shown by way of example as being arbitrary numbers denoting energy consumption values. E_consumed(t) corresponds to the energy outflow/P_consumed(t) 3 described hereinbefore with reference to FIG. 1. In an embodiment of the present invention, E_consumed(t) is predicted on an individual level, that is, per energy storage device 1, for later use in predicting the expected energy demand of that device in a given planning time-period in the future, the latter being described with reference to FIG. 4.

Figure 4:
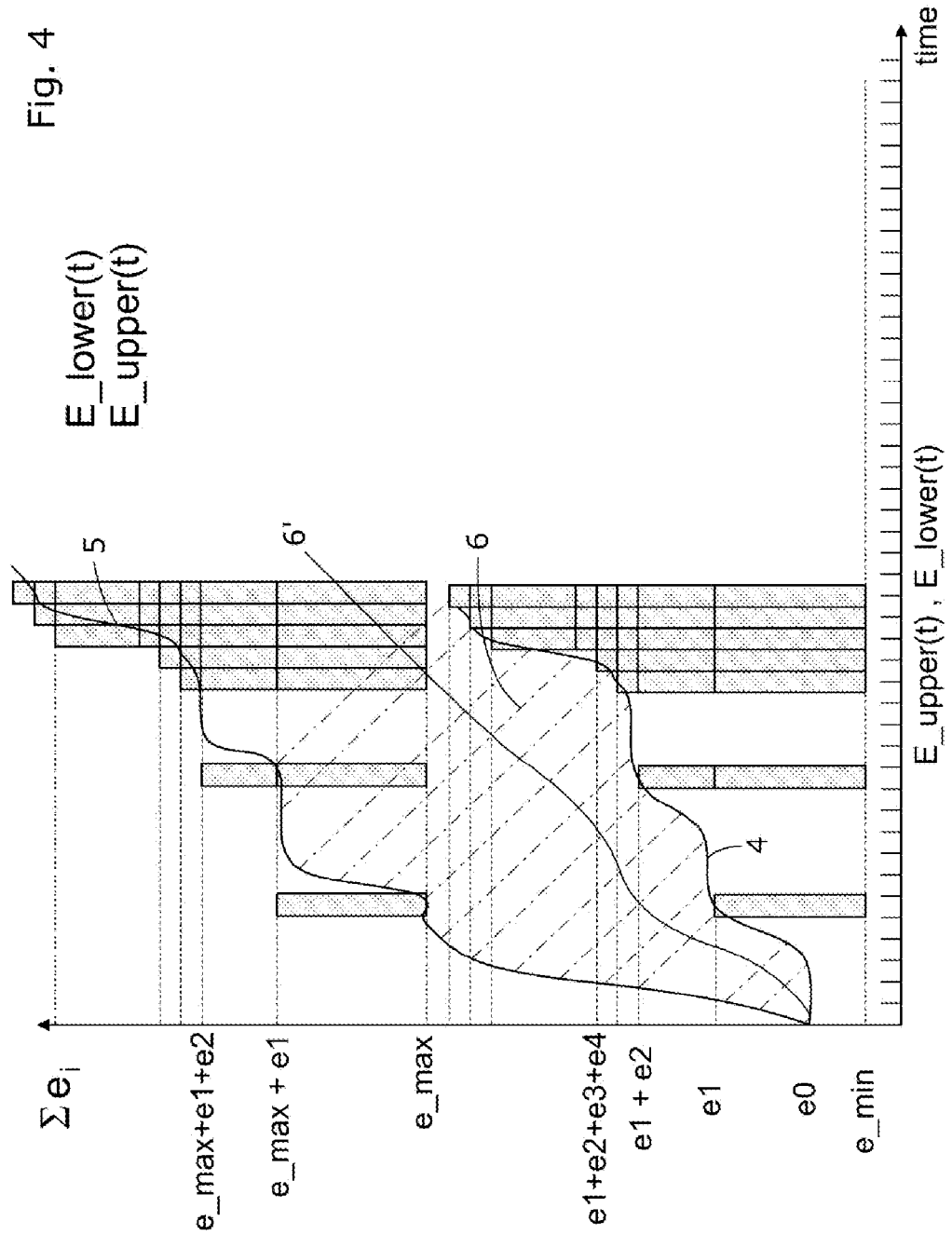
FIG. 4 schematically illustrates the generation of energy functions, E_lower(t) and E_upper(t) in an embodiment of the present invention.

In an embodiment of the present invention, the energy dimension/energy flexibility of the energy storage device 1 in an embodiment of the present invention is also determined by prediction. In this regard, two time-varying functions, E_lower(t) and E_upper(t) are generated for a given planning time-period. As shown in FIG. 4, E_lower(t) and E_upper(t) are respectively denoted by reference numerals 4 and 5, the planning time-period comprises discrete time-slots, each time-slot being of known duration, and each planning time-period comprises a known number of time-slots. Regarding the generation of the curves in FIG. 4, the following are known: e0, the resident/initial amount energy in the energy storage device 1 at a given point in time before the occurrence of a given set of energy consumption events, which, in the present example, is the energy stored in the energy storage device 1 before the consumption of e1, that is, at the start of the planning period; e_max, the maximum amount of energy that may be provided to the energy storage device 1, that is, the uppermost limit on how much energy may be stored by the energy storage device 1, and e_min, the minimum amount of energy/lowermost limit on the energy to be maintained in the energy storage device 1, e_min being relevant for certain types of devices such as, for example, accumulators that should be maintained at a certain charging level so as to prevent premature ageing.

One scenario of charging activity in an embodiment of the present invention, which is mapped in order to generate E_lower(t) 4, is now described with reference to FIG. 4. As can be seen, the first energy demand/energy consumption event is denoted by the bar corresponding to the consumption of energy e1. It can also clearly be seen from the curve corresponding to E_lower(t) 4 that, to start of with, the energy levels in the energy storage device 1 are at e0 and replenishment to e1 is delayed as late as possible before the consumption of e1 occurs and such that the demand for e1 is met. Regarding the next demand for energy as denoted by the consumption of e2, and as can be seen from the shape of the curve corresponding to E_lower(t) 4, the energy levels of the energy storage device 1 are maintained at e1 and charging with e2 is delayed as late as possible before the consumption of e2. This scenario of charging activity in an embodiment of the present invention is referred to as late charging.

Another scenario of charging activity in an embodiment of the present invention is mapped to generate E_upper(t) 5 in FIG. 4. It can be seen that the energy levels of the energy storage device 1 are ramped from e0 to the full capacity of the energy storage device 1, that is, e_max, before the occurrence of any energy consumption event/energy demand. As soon as the first energy consumption event occurs, that is, the consumption of e1, the energy levels of the energy storage device 1 are immediately restored to compensate for the consumption of e1 and back to e_max as can be seen from the shape of curve E_upper(t) 5. As soon as the next energy consumption event occurs, that is, the consumption of e2, the energy levels are immediately replenished to compensate for the consumption of e2. This other scenario of charging activity in an embodiment of the present invention is referred to as early charging. In this scenario, a constraint is observed in that the energy levels in the energy storage device 1 do not exceed e_max by charging.

Where the energy storage device 1 is the battery of an electric vehicle in an embodiment of the present invention, there must always be enough energy in the battery to accomplish the next trip. In this case, E_lower(t) 4 should be greater than or equal to the energy demand of all previous trips including the next trip. Such an energy level has to be reached before the next trip takes place as accomplished by late charging. In the present example, E_upper(t) 5 is given by the maximum amount of energy that the battery of the electric vehicle can hold and with full recharging taking place immediately after each trip as done with early charging.

Where the energy storage device 1 is an electrical hot water boiler in an embodiment of the present invention, and in the case of late charging, heating of the water would be delayed to just before the next predicted demand occurs whilst taking into account the maximum rate with which energy can be supplied to the device, that is, its associated P_max(t). In the case of early charging in the present example, the boiler would be heated up immediately after some demand has lowered the energy content E(t) of the boiler. In the present example, if hot water is required for consumption at 6.00 am, two scenarios are anticipated in the context of an embodiment of the present invention: the boiler is heated to meet the consumption event at 6.00 am immediately after the last consumption event at night, which scenario represents early charging, or the boiler may be heated for example, at 4.00 am until 6.00 am, taking into account the rate at which the boiler may be heated and also that the demand placed by the consumption event is met, that is, the water is heated to the desired temperature by 6.00 am. This scenario represents late charging.

E_lower(t) 4 and E_upper(t) 5 are determined for a given planning time-period on the basis of the predicted data on the energy consumed, E_consumed(t) by the energy storage device 1 in another previously-specified time-window that corresponds with the current planning time-period. Thus, discrete time-slots in the given time-window for E_consumed(t) and the given planning time-period for E_lower(t) and E_upper(t) correspond with each other. This is better understood by viewing FIG. 4 in conjunction with FIG. 3. As can be seen, the first energy consumption event e1 is depicted in the same discrete time-slot in FIGS. 3 and 4. The second energy consumption event e2 shown in FIG. 3 is consecutively accumulated/added with e1 in FIG. 4. The third energy consumption event e3 shown in FIG. 3 is accumulated with e1 and e2 in FIG. 4. In this manner, all the predicted energy consumption events shown in FIG. 3 are charted in FIG. 4 by addition/accumulation thereof. An advantage of representing the energy characteristics in this way is that addition is a linear operation and can, therefore, be performed with reduced processing complexity and improved efficiency compared to if, for example, non-linear operations were used for such representation. A further advantage is that a hierarchical accumulation of the energy demand E_upper(t), E_lower(t) may be done, this also being the case for the predicted power flexibility P_max(t), P_min(t) in an embodiment of the present invention.

E_lower(t) 4 and E_upper(t) 5 reflect the anticipated/predicted energy needs of an energy storage device 1 in an embodiment of the present invention. However, statistical data may show that the actual energy consumption by the energy storage device 1 differs from what has been predicted for that device in the given time-window. For example, and with reference to FIG. 4, it could be that, in the first energy consumption event, more energy than e1 is consumed and that it occurs earlier than predicted, i.e. before the time-slot in which the occurrence of e1 is predicted. In an embodiment of the present invention, these prediction errors may be accounted for by making corresponding changes to the early and late charging used in the production of E_lower(t) 4 and E_upper(t) 5.

As discussed earlier, E_lower(t) 4 and E_upper(t) 5 reflect the anticipated/predicted energy needs of an energy storage device 1 in an embodiment of the present invention in a given planning time-period and so may be used to advantage in the production of a schedule for the allocation of power to such a device over that time-period.

E_lower(t) 4 and E_upper(t) 5 may be considered as limiting envelopes, defining a feasible range 6 of energy levels over time. In FIG. 4, this range 6 is shown as the hashed region between E_lower(t) 4 and E_upper(t) 5. The energy supplied E_sup(t) by the energy supplier to the energy storage device 1 in an embodiment of the present invention may fall anywhere within this range 6, that is, the condition E_lower(t)<E_sup(t)<E_upper(t) is to be satisfied; an example of E_sup(t) is depicted by the curve denoted by reference numeral 6' in FIG. 4. In the range 6 between E_lower(t) 4 and E_upper(t) 5, the energy supplier has flexibility in terms of the time and power delivered to the device, with the possible discretisation of power levels where the energy storage device 1 is unable to accept continuously variable power levels. Regarding the provision of power over a given time-period, the energy supplier should do so without violating the power constraints of the energy storage device 1. This is better understood by considering that:

$$E_{sup}(t) = \int_0^t p_{ref}(\tau) d\tau$$

where P_ref(t) is the supplied, reference power and so that the power constraints in an embodiment of the present invention are not violated, the condition P_min(t)≤P_ref(t)≤P_max(t) should be satisfied, where P_min(t) and P_max(t) have been hereinbefore described with reference to FIGS. 2a and 2b.

Figure 5:
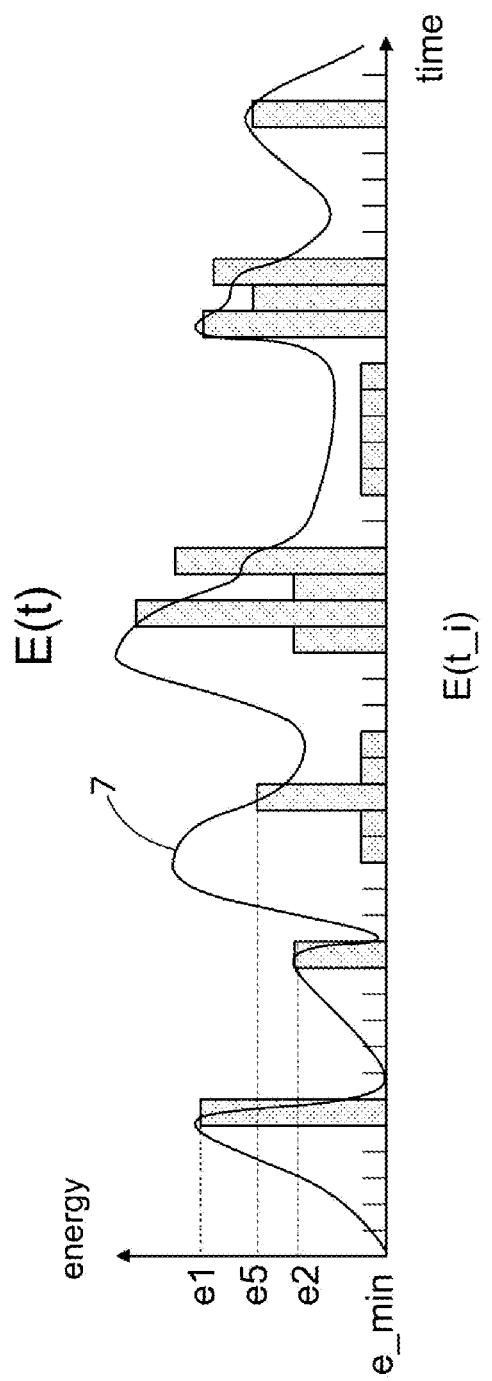
FIG. 5 schematically illustrates the energy E(t) stored in an energy storage device in an embodiment of the present invention.

An example of the energy E(t) predicted to be stored in an energy storage device 1 in an embodiment of the present invention is shown in FIG. 5. E(t) is represented by curve 7 in FIG. 5. Its form is dependent on the fluctuation/variation of the energy resource selected to supply energy E_ref(t) to the energy storage device 1 in the present example and also on the predicted energy consumption events E_consumed(t) of the device as previously discussed in relation to FIG. 3. This is the case since E(t) is given by: E(t)=E_ref(t)−E_consumed(t)+e0.

Figure 6:
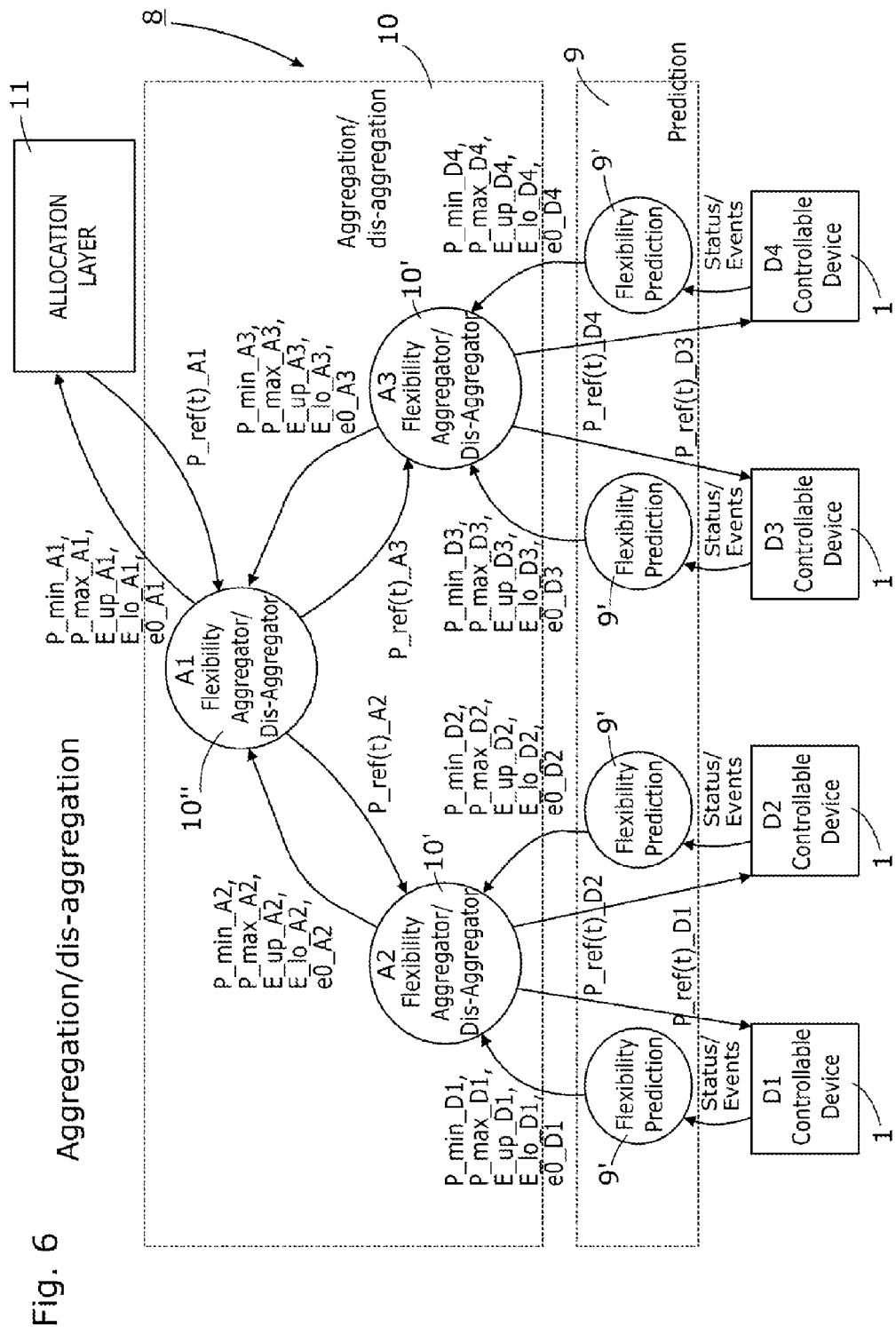
FIG. 6 schematically illustrates the aggregation-disaggregation model of an embodiment of the present invention, and FIG. 7 schematically illustrates a control loop according to an embodiment of the present invention.

Reference is now made to FIG. 6, which schematically illustrates an energy allocation system 8 according to an embodiment of a second aspect of the present invention for the allocation of energy to a given set of energy storage devices, thereby to substantially balance energy consumption by each of the energy storage devices in the given set with the energy supplied thereto. By way of example, four energy storage devices D1, D2, D3, D4 are shown to form the given set of energy storage devices in FIG. 6. Of course, an embodiment of the present invention is not limited thereto and any desired number of energy storage devices may form part of the given set. The energy storage devices in the given set are arranged in a hierarchical tree of nodes comprising at least a parent node with corresponding children nodes. In this regard, the energy allocation system 8 may be directed to: where there is a single parent node that covers a given number of energy storage devices—for example, parent node A2 covering children nodes D1 and D2 or parent node A3 covering children nodes D3 and D4, or the case where there are a multiple number of parent nodes, such as, for example, household parent nodes A2, A3 each covering a corresponding group of energy storage devices D1, D2, D3, D4, although not shown in FIG. 6, area parent nodes that cover corresponding households A2, A3, and a town parent node A1 covering corresponding areas, with the stated parent nodes A2, A3, A1 occurring in different layers 9,10 of, and in ascending order, in the hierarchy of the energy allocation system 8.

The energy allocation system 8 comprises at least a prediction layer 9 to which each of the energy storage devices D1, D2, D3, D4 in the given set communicates information on its energy status, i.e. energy levels, and status on discrete events, such as, for example, whether the device is connected to/disconnected from the power grid, switched on/off, consumption of hot water, thermostat level setting, etc. The prediction layer 9 is configurable to predict at least a demand for energy in discrete time-slots in a given planning time-period in the future, also generally referred to as energy flexibility data, and to generate power flexibility data, for each of the energy storage devices D1, D2, D3, D4 in the given set from information on an energy status and event status of each of the devices. In this regard, the information that is used for the generation of the energy demand prediction and the power flexibility data is, for example, historical data and/or statistical data generated from energy status and event status information collected on each of the energy storage devices in different time-windows. The prediction layer 9 may comprise a database for storing such historical or statistical information. Regarding the power flexibility data generated by the prediction layer 9, an upper time-varying power function P_max(t) and a lower time-varying power function P_min(t) as hereinbefore described with reference to FIGS. 2a and 2b are generated, which respectively represent the maximum power and the minimum power that can be supplied to the given energy storage device at any point in time when it is in use. Regarding the energy demand prediction, the information communicated to the prediction layer 9 on the energy status on any given energy device comprises predicted data on the energy consumption by that device in discrete time-slots in a given time-window that correspond with the discrete time-slots in the planning time-period, as hereinbefore described with reference to FIG. 3. The energy demand prediction is based on the consecutive accumulation of the predicted energy consumption data per discrete time-slots in the planning time-period and generating therefrom and as hereinbefore described with reference to FIG. 4: an upper energy function $E\_upper(t)$ 5, where energy is taken to be supplied to the energy storage device immediately after the occurrence of an energy consumption event and so as to replenish the energy storage device with the energy consumed in that energy consumption event; a lower energy function $E\_lower(t)$ 4, where energy is taken to be supplied to the energy storage device just before the occurrence of an energy consumption event and such that a demand for energy corresponding to that energy consumption event is met, and the initial amount energy e0 in the energy storage device at a given point in time before the occurrence of a given set of energy consumption events, for example, at the start of the planning period. So, and in summary, the prediction layer 9 generates $P\_max(t)$, $P\_min(t)$, $E\_upper(t)$, $E\_lower(t)$ and e0 for each of the energy storage devices 1 in the given set. An embodiment of the present invention is not limited to the use of a specific algorithm to perform the prediction in the prediction layer 9 and, indeed, any prediction algorithm that facilitates the generation of $P\_max(t)$, $P\_min(t)$, $E\_upper(t)$, $E\_lower(t)$ and e0 may be used. The prediction layer 9 may be implemented by way of an automated prediction system where explicit user intervention may be used to over-rule and/or guide such a system. In the example shown in FIG. 6, the prediction layer is implemented in a decentralised format, that is, each of the energy storage devices in the given set has an associated prediction entity 9'. Of course, an embodiment of the present invention is not limited to such a format and a centralised format with a centralised prediction and forecasting service may also be used in an embodiment of the present invention.

The energy allocation system 8 further comprises an aggregation layer 10 comprising an aggregation sub-layer 10' and an aggregation top layer 10". The aggregation sub-layer 10', A2, A3 is configurable to hierarchically aggregate the energy demand prediction and power flexibility data for the given set of energy storage devices D1, D2, D3, D4 received from the prediction layer 9, which is additive for $P\_max(t)$, $P\_min(t)$, $E\_upper(t)$, $E\_lower(t)$, e0 as shown in FIG. 6. The aggregation top-layer 10", A1 is configurable to aggregate the results of the aggregation sub-layer 10', A2, A3 thereby to obtain data on the total energy demand prediction and power flexibility for the given set of energy storage devices in an embodiment of the present invention.

Also provided in an embodiment of the present invention is an allocation layer 11, which is configurable to generate a reference power supply curve $P\_ref(t)\_A1$ indicating the power available for supply in the discrete time-slots of the planning time-period to the given set of energy storage devices D1, D2, D3, D4 based on the aggregation results received from the aggregation top-layer 10 and a prediction on the energy supply by a given energy resource that has been selected to supply energy to the given set of energy storage devices. For example, in the prediction on the energy supply by the aforementioned selected energy resource, market prices for electrical power, availability of renewable energy resources or any combination thereof may be used. By energy supply with respect to a given energy resource in an embodiment of the present invention, it may mean energy supplied by an energy market, for example, or, indeed, energy generated by a provider, an example of the latter being a power plant.

In an embodiment of the present invention, the aggregation layer 10 is configurable to hierarchically disaggregate the reference power supply curve $P\_ref(t)\_A1$ into individual power supply curves for provision to each of the energy storage devices in the given set of energy storage devices $P\_ref(t)\_D1$, $P\_ref(t)\_D2$, $P\_ref(t)\_D3$, $P\_ref(t)\_D4$, thereby giving each of the energy storage devices a corresponding power schedule to be followed on when to consume energy and how much energy to consume in a given point in time when the energy storage device is in use in the given planning time-period. With reference to FIG. 6 and by way of example, the aggregation top-layer 10", A1 disaggregates $P\_ref(t)\_A1$ received from the allocation layer 11 into $P\_ref(t)\_A2$ and $P\_ref(t)\_A3$ for supply to the aggregation sub-layer 10', A2, A3. The aggregation sub-layer 10', A2, A3 then performs a further disaggregation to produce individual power supply curves $P\_ref(t)\_D1$, $P\_ref(t)\_D2$, $P\_ref(t)\_D3$, $P\_ref(t)\_D4$ for provision to each of the energy storage devices D1, D2, D3, D4.

Regarding the reference power supply curve $P\_ref(t)\_A1$, it needs to be distributed through each level 10", A1, 10', A2, A3, 9, 9' of the hierarchy in an embodiment of the present invention. An algorithm may be used for the performance of the disaggregation by allocating power to each aggregator descendant. However, this may not guarantee feasible energy inflows into the lower aggregation layers. An example of hierarchical disaggregation that may be performed in an embodiment of the present invention is such that the power to be supplied $P\_ref(t)\_A1$ to the given set of devices D1, D2, D3, D4 in a given time-slot in the planning time-period is a sum of the power to be supplied to each of the storage devices in that time-slot $P\_ref(t)$ D1, $P\_ref(t)$ D2, $P\_ref(t)$ D3, $P\_ref(t)$ D4 and such that constraints set by the power flexibility $P\_max(t)$, $P\_min(t)$ and energy demand prediction $E\_upper(t)$, $E\_lower(t)$, e0 for each of the energy storage devices are met. In an embodiment of the present invention, the assumption is made that the energy storage device 1 receives variable power, making for a linear program (LP) or non-linear program (NLP) optimisation problem. In practice, the devices may only exhibit discrete power levels leading to an integer program (IP) optimisation or some LP/NLP set-up with heuristics, for example, pulse-width modulation (PWM) on the sub-slot time interval.

Where information on a geographic location of at least a given energy storage device is provided to the prediction layer 9 in an embodiment of the present invention, then the energy demand for a given area may be ascertained. This feature is advantageous where constraints in power delivery to certain areas exist. Where information on the geographic location of a given energy storage device is appended to the information provided to the prediction layer 9, then aggregation of this information may be based in weighted averaging of power/energy curves, thus only reflecting an approximate location of demand, which would have to be mapped onto power grid areas.

In an embodiment of the present invention, the prediction layer 9 is configurable to reiterate energy demand prediction and generation of power flexibility data for at least a given parent node in response to a trigger being provided by at least one of its corresponding children nodes. In this regard, if at least one energy storage device D1, D2, D3, D4 in the set updates its predicted power flexibility and/or energy demand prediction, the aggregation-disaggregation as performed in an embodiment of the present invention may be triggered on demand from the leaf level in the hierarchy. For a relatively deep hierarchy, the changes in flexibility in terms of power and energy would not propagate all the way to the top level of the hierarchy, leaving the allocated power schedule on the aggregation level unchanged. This is beneficial if, for example, commitments on the aggregation layer 10 have been made towards a third party, such as, the day-ahead market, a retailer, balancing responsible party, while aggregating stochastic devices on the device level.

According to an embodiment of a third aspect of the present invention, there is provided a control loop 12 for the allocation of energy to at least an energy storage device 1 thereby to substantially balance energy consumption by the energy storage device 1 with the energy supplied thereto. Provided in the control loop 12 is an energy consumption monitoring unit 13 for predicting data on the energy consumption by the energy storage device over a given time-window when the energy storage device is in use, as hereinbefore described with reference to FIG. 3. The predicted energy consumption data generated by the energy consumption monitoring unit 13 is communicated to a demand prediction unit 14, which predicts a demand for energy by the energy storage device 1 in a given planning time-period in the future on the basis of the received energy consumption prediction. This is done by the generation of power flexibility data, P_max(t), P_min(t) as discussed in relation to FIGS. 2a and 2b, and the generation of E_upper(t) and E_lower(t) using the principles of early and late charging according to an embodiment of the present invention as described with reference to FIG. 4. The control loop 12 also comprises an energy supply prediction unit 15 for predicting energy supply in the given planning time-period by a given energy resource that has been selected to supply energy to the energy storage device 1. Such a selected energy resource may, for example, be a renewable energy resource or energy resource available on/bought from an energy market, for example, fossil fuels. The energy demand prediction for the energy storage device generated by the demand prediction unit 14 and the energy supply prediction for the selected energy resource produced by the energy generation prediction unit 15 are provided to a schedule provider unit 16 in the control loop 12, for use in producing a schedule for the provision of power to the energy storage device 1 in the given planning time-period.

Figure 7:
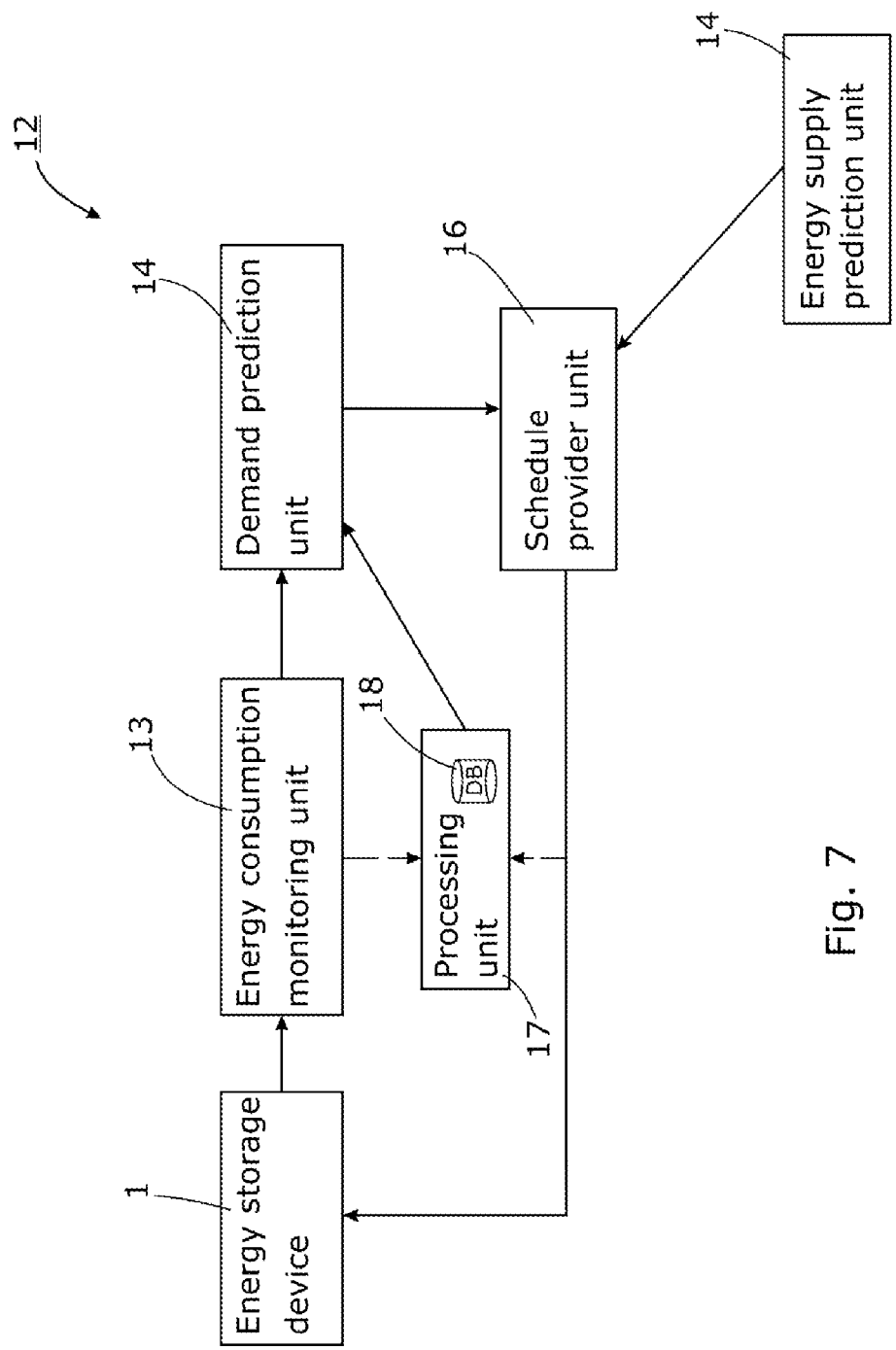

Also provided in the control loop 12 according to an embodiment of the present invention, is a processing unit 17 for processing the energy consumption data predicted for the energy storage device in the given time-window and the schedule produced for the provision of power to the energy storage device in the given planning time-period, thereby to predict a future demand for energy by the energy storage device in another planning time-period. In this regard, for the storage of energy consumption data produced by the energy consumption monitoring unit 13 and the power schedule produced by the schedule provider unit 16, a database 18 may be provided. In the example shown in FIG. 7, the database 18 is provided as a part of the processing unit 17 but, of course, an embodiment of the present invention is not limited to this arrangement and, indeed, the database 18 may be provided independently from the processing unit 17.

Regarding the demand prediction unit 14, it is configurable to respond to a trigger to initiate prediction of the energy demand, the trigger being one of an automated event, such as, for example, a timer, and a user intervention event.

As for the energy supply prediction unit 15, it is configurable to use at least a generation forecast, cost factors or a combination thereof for the prediction of energy supply/generation by the selected energy resource; it may also be configured to use grid constraints for the prediction of energy supply/generation by the selected energy resource when geographic information on the energy storage device is known.

Where the control loop 12 is engaged to perform the allocation of energy for more than one energy storage device 1, the schedule provider unit 16 is configured to include the aggregation layer 10 and the allocation layer 11 as described in relation to FIG. 6.

An embodiment of the present invention is not limited to a specific type of renewable/fluctuating energy resource. Encompassed within the scope of the invention are, for example, wind energy, solar power generation whether photo-voltaic or solar-driven steam turbine generation, and other compatible fluctuating/renewable energy resources.

Features of one aspect of the invention may be applied to any other aspect and vice versa. Any disclosed embodiment may be combined with one or several of the other embodiments shown and/or described.

In any of the above aspects, the various features may be implemented in hardware or as software modules running on one or more data processors.

The present invention has been described above purely by way of example and modifications of detail may be made within the scope of the invention.

Each feature disclosed in the description, and where appropriate, the claims and drawings, may be provided independently or in any appropriate combination.

What is claimed is:

1. A method for operating at least an energy storage device to substantially balance the energy consumed by the energy storage device with the energy supplied thereto, comprising:
   determining a power flexibility of the energy storage device by generating an upper time-varying power function and a lower time-varying power function that respectively represent the maximum power and the minimum power that can be supplied to the device at any given point in time when the energy storage device is in use;
   predicting energy consumption data per discrete time-slots over a given time-window for the device;
   predicting a demand for energy by the device in a given planning time-period by consecutively accumulating the predicted energy consumption data per discrete time-slots in the planning time-period that correspond with the discrete time-slots in the time-window over which the energy consumption data is predicted;
   generating a time-varying upper energy function for the demand prediction that defines an uppermost limit for the supply of energy to the device;
   generating a time-varying lower energy function for the demand prediction that defines a lowermost limit for the supply of energy to the device, and
   supplying energy to the device in a range defined by and between the limits specified by the upper energy function and the lower energy function,
   wherein, in the generating of the upper energy function, energy is taken to be supplied to the device immediately after the occurrence of an energy consumption event and so as to replenish the device with the energy consumed in the energy consumption event.

2. The method as claimed in claim 1 wherein, in the supplying of energy to the device, the power provided to the device at any given point in time is selected to be within a range defined by, and between, the limits specified by the upper power function and the lower power function.

3. The method as claimed in claim 1 wherein, in the generating of the lower energy function, energy is taken to be supplied to the energy storage device just before the occurrence of an energy consumption event and such that a demand for energy corresponding to that energy consumption event is met.

4. The method as claimed in claim 3 wherein an initial amount of energy e0 in the energy storage device at a given point in time before the occurrence of a given set of energy consumption events, a maximum amount of energy e_max that may be provided to the energy storage device, and a minimum amount of energy e_min to be maintained in the energy storage device are determined.

5. The method as claimed in claim 4 wherein, in the generating of the upper energy function, the energy levels in the energy storage device are taken to be ramped from the initial amount of energy e0 stored in the device to the maximum amount of energy e_max that may be provided to the energy storage device, before the occurrence of any energy consumption events.

6. An energy allocation system for allocating energy to at least a given set of energy storage devices that are arranged in a hierarchical tree of nodes comprising at least a parent node with corresponding children nodes, thereby to substantially balance energy consumption by each of the energy storage devices with the energy supplied thereto, the system comprising:

at least a prediction layer being configurable to predict at least a demand for energy in discrete time-slots in a given planning time-period in the future and to generate power flexibility data for each of the energy storage devices in the given set from information on at least an energy status and event status of each of the devices at a given point in time;

an aggregation layer comprising an aggregation sub-layer that is configurable to hierarchically aggregate the energy demand prediction and power flexibility data for the given set of energy storage devices, and an aggregation top-layer that is configurable to aggregate the results of the aggregation sub-layer, thereby to obtain data on the total energy demand prediction and power flexibility for the given set of energy storage devices;

an allocation layer, which is configurable to generate a reference power supply curve indicating the power available for supply in the discrete time-slots of the planning time-period to the given set of energy storage devices based on the aggregation results received from the aggregation top-layer and a prediction on the energy supply by a given energy resource that has been selected to supply energy to the given set of energy storage devices, wherein the aggregation layer is configurable to hierarchically disaggregate the reference power supply curve into individual power supply curves for provision to each of the energy storage devices in the given set of energy storage devices, thereby giving each of the energy storage devices a corresponding power schedule to be followed on when to consume energy and how much energy to consume in a given point in time when the energy storage device is in use in the given planning time-period.

7. The energy allocation system as claimed in claim 6 wherein the power flexibility data for a given energy storage device is given by an upper time-varying power function and a lower time-varying power function that respectively represent the maximum power and the minimum power that can be supplied to the given energy storage device at any point in time when it is in use.

8. The energy allocation system as claimed in claim 6 wherein the energy status on any given energy device comprises predicted data on the energy consumption by that device in discrete time-slots in a given time-window that correspond with the discrete time-slots in the planning time-period, with the energy demand prediction being done by consecutively accumulating the predicted energy consumption data per discrete time-slots in the planning time-period.

9. The energy allocation system as claimed in claim 8 wherein the demand for energy by a given energy storage device in the given planning time-period is given by:

an upper energy function, where energy is taken to be supplied to the energy storage device immediately after the occurrence of an energy consumption event and so as to replenish the energy storage device with the energy consumed in that energy consumption event;

a lower energy function, where energy is taken to be supplied to the energy storage device just before the occurrence of an energy consumption event and such that a demand for energy corresponding to that energy consumption event is met, and the initial amount energy e0 in the energy storage device at a given point in time before the occurrence of a given set of energy consumption events.

10. The energy allocation system as claimed in claim 6 wherein hierarchical aggregation at the aggregation layer is done by the addition of the respective power flexibility values and the addition of the respective energy demand predictions for the given set of energy storage devices.

11. The energy allocation system as claimed in 10 wherein hierarchical disaggregation is performed such that the power to be supplied to the given set of devices in a given time-slot in the planning time-period is a sum of the power to be supplied to each of the storage devices in that time-slot and such that constraints set by the power flexibility and energy demand prediction for each of the energy storage devices are met.

12. The energy allocation system as claimed in claim 6 wherein information on a geographic location of at least a given energy storage device is provided to the prediction layer.

13. The energy allocation system as claimed in claim 6 wherein the prediction layer is configurable to reiterate energy demand prediction and generation of power flexibility data for at least a given parent node in response to a trigger being provided by at least one of its corresponding children nodes.

14. A control loop for the allocation of energy to at least an energy storage device thereby to substantially balance energy consumption by the energy storage device with the energy supplied thereto, comprising:

at least an energy consumption monitoring unit for predicting data on the energy consumption by the energy storage device over a given time-window when the energy storage device is in use;

at least a demand prediction unit for: predicting a demand for energy by the energy storage device in a given planning time-period in the future on the basis of the predicted energy consumption data, generating a time-varying upper energy function for the predicted energy demand that defines an uppermost limit for the supply of energy to the device, and generating a time-varying lower energy function for the predicted energy demand that defines a lowermost limit for the supply of energy to the device;

at least an energy supply prediction unit for predicting energy supply in the given planning time-period by a given energy resource that has been selected to supply energy to the energy storage device; and at least a schedule provider unit for producing a schedule for the provision of power to the energy storage device in the given planning time-period on the basis of the predicted energy demand of the energy storage device and the predicted energy supply by the selected energy resource, and in a range defined by and between the limits specified by the upper energy function and the lower energy function, wherein, in the generating of the upper energy function by the demand prediction unit, energy is taken to be supplied to the device immediately after the occurrence of an energy consumption event and so as to replenish the device with the energy consumed in the energy consumption event.

15. The control loop as claimed in claim 14 comprising a processing unit for processing the energy consumption data predicted for the energy storage device in the given time-window and the schedule produced for the provision of power to the energy storage device in the given planning time-period, thereby to predict a future demand for energy by the energy storage device in another planning time-period.

16. The control loop as claimed in claim 14 comprising a database for storing the predicted energy consumption data and the produced power schedule.

17. The control loop as claimed in claim 14 wherein the demand prediction unit is configurable to respond to a trigger to initiate prediction of the energy demand, the trigger being one of an automated event and a user intervention event.

18. The control loop as claimed in claim 14 wherein the energy supply prediction unit is configurable to use at least a generation forecast, cost factors or a combination thereof for the prediction of energy supply by the selected energy resource.

19. The control loop as claimed in claim 14 wherein the energy supply prediction unit is configurable to use grid constraints for the prediction of energy supply by the selected energy resource when geographic information on the energy storage device is known.

* * * * *